(12) United States Patent
Blum

(10) Patent No.: US 7,645,099 B2
(45) Date of Patent: Jan. 12, 2010

(54) APPARATUS FOR MACHINING A WORKPIECE

(75) Inventor: Norbert Blum, Hüttlingen (DE)

(73) Assignee: Carl Zeiss Vision GmbH, Aalen (DE)

( * ) Notice: Subject to any disclaimer, the term of this patent is extended or adjusted under 35 U.S.C. 154(b) by 348 days.

(21) Appl. No.: 11/410,204

(22) Filed: Apr. 25, 2006

(65) Prior Publication Data

US 2006/0210363 A1    Sep. 21, 2006

Related U.S. Application Data

(63) Continuation of application No. PCT/EP2004/011035, filed on Oct. 2, 2004.

(30) Foreign Application Priority Data

Oct. 31, 2003    (DE) ................. 103 50 877

(51) Int. Cl.
  *B23B 27/16* (2006.01)
  *B23B 1/00* (2006.01)
(52) U.S. Cl. .......................... 407/66; 407/30
(58) Field of Classification Search ............. 407/101, 407/107, 66, 67, 30, 33, 89
  See application file for complete search history.

(56) References Cited

U.S. PATENT DOCUMENTS

| | | | | |
|---|---|---|---|---|
| 1,410,714 A | * | 3/1922 | Ostermann | 407/82 |
| 1,413,326 A | * | 4/1922 | Dover | 407/10 |
| 3,125,798 A | * | 3/1964 | Stein | 407/83 |
| 4,332,513 A | * | 6/1982 | Gowanlock | 407/101 |
| 5,159,863 A | * | 11/1992 | Simpson, III | 82/1.11 |
| 5,913,643 A | * | 6/1999 | Fowler et al. | 407/36 |
| 5,967,705 A | | 10/1999 | Wermeister | |
| 2003/0043343 A1 | | 3/2003 | Diehl et al. | |

FOREIGN PATENT DOCUMENTS

DE    203 07 208 U    9/2003
FR    2 271 894    12/1975

OTHER PUBLICATIONS

PCT/IB/338.
PCT/IB/373.
PCT/ISA/237.

* cited by examiner

*Primary Examiner*—Will Fridie, Jr.
(74) *Attorney, Agent, or Firm*—Walter Ottesen

(57) ABSTRACT

A machining apparatus includes at least one tool holder (1) and at least one cutting tool (2) that are detachably interconnected. At least one first marking (7a) is provided on the tool holder (1) and at least one further marking (7b) is provided on the cutting tool (2). When connecting the tool holder (1) to the cutting tool (2), they can be aligned with each other with the aid of the markings (7a, 7b). The machining apparatus is preferably used for machining spectacle lenses, especially progressive lenses.

18 Claims, 2 Drawing Sheets

APPARATUS FOR MACHINING A
WORKPIECE

CROSS REFERENCE TO RELATED APPLICATIONS

This application is a continuation application of international patent application PCT/EP 2004/011035, filed Oct. 2, 2004, and claiming priority from German application 103 50 877.5, filed Oct. 31, 2003, and the entire content of both applications is incorporated herein by reference.

FIELD OF THE INVENTION

The invention relates to an apparatus for machining a workpiece and includes at least one tool holder and at least one cutting tool. The tool holder and the cutting tool are detachably connected to each other.

BACKGROUND OF THE INVENTION

Simple cutting tools for machining are known which can be mounted on tool holders in many different ways, for example, with a threaded connection. The exact positioning of the cutting tool to the tool holder can be achieved only via complex experimentation, for example, iterative cutting or by means of adjusting apparatus.

U.S. Pat. No. 5,967,705 discloses a cutting tool wherein a cutting element can be self aligned via several serrations in the cutting tool. It is here disadvantageous that the cutting element and the cutting tool are not provided with markings. Accordingly, in a first step, an attempt must be made to bring the cutting element and the cutting tool into the desired position by means of a key. Thereafter, the adjustment of the cutting tool achieved in this manner can be checked with an adjusting apparatus. If the setting wanted does not yet correspond to the desired values, then a readjustment is necessary. This is a very time intensive process for which expensive adjusting apparatus are needed. The adjustment or setting could also take place via iterative cuttings on a specimen workpiece. However, this procedure would also be time intensive and cost intensive.

SUMMARY OF THE INVENTION

In view of the above, it is an object of the invention to provide an apparatus for machining a workpiece with which the cutting tool and tool holder are positioned correctly with respect to each other in a simple and rapid manner.

According to a feature of the invention, at least a first marking is provided on the tool holder and at least one additional marking is provided on the cutting tool. The tool holder and cutting tool can be aligned with respect to each other by means of their respective markings when connecting the tool holder to the cutting tool.

According to another feature of the invention, the first and additional markings can be configured to work together as a Vernier scale. More specifically, the markings on the tool holder and on the cutting element when viewed as a whole constitute a Vernier scale. In this way, very precise settings are possible.

The first and additional markers can be configured as marking points and/or marking crosses. The markings of all types can be imprinted upon the cutting tool and the tool holder. Engravings and additional possibilities for application are also possible.

According to still another feature of the invention, the cutting tool can include a plate and a cutting element attached to the plate, especially by soldering. The plate can at least partially be configured as a circularly-shaped plate. Metal, especially hard metal, can be used as a plate material. A diamond, especially a natural diamond, can be provided as the cutting element. Metal cutters or ceramic cutters filled with, for example, diamond dust can also be used.

In a preferred embodiment, the cutting element has an opening angle in the range of 40° to 80° and this opening angle is especially 60°. The radius of the cutting element can lie in a range between 2 to 10 mm and is especially 5 mm.

In accordance with the invention, the apparatus is used for machining spectacle lenses, especially spectacle lenses having progressive surfaces. It is understood that spectacle lenses of the most varied type and especially individual spectacle lenses can be machined with the device of the invention. The device of the invention can, however, also be used in the most varied areas for machining of glass, ceramic, plastics and metals.

With the apparatus of the invention, it is made possible that the cutting element can be adjusted immediately so that the machining (for example, in the diamond rotation process) can take place in the manner expected. More specifically, this immediate adjustment takes place during attachment of the work tool on the tool holder for installation in the machine, for example, in a high speed cutting machine. In this way, no damage is done to the workpieces because of an incorrect cutting. In addition, the service life of the cutting tool is lengthened which is of special concern with respect to costly natural diamonds. Especially in the machining of spectacle lenses, the adjustment must be exact because only in this way is a micrometer-precise cutting of the excess material possible. Because of the simple manipulation afforded by the invention, a substantial savings in time is achieved and expensive adjusting apparatus are not needed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
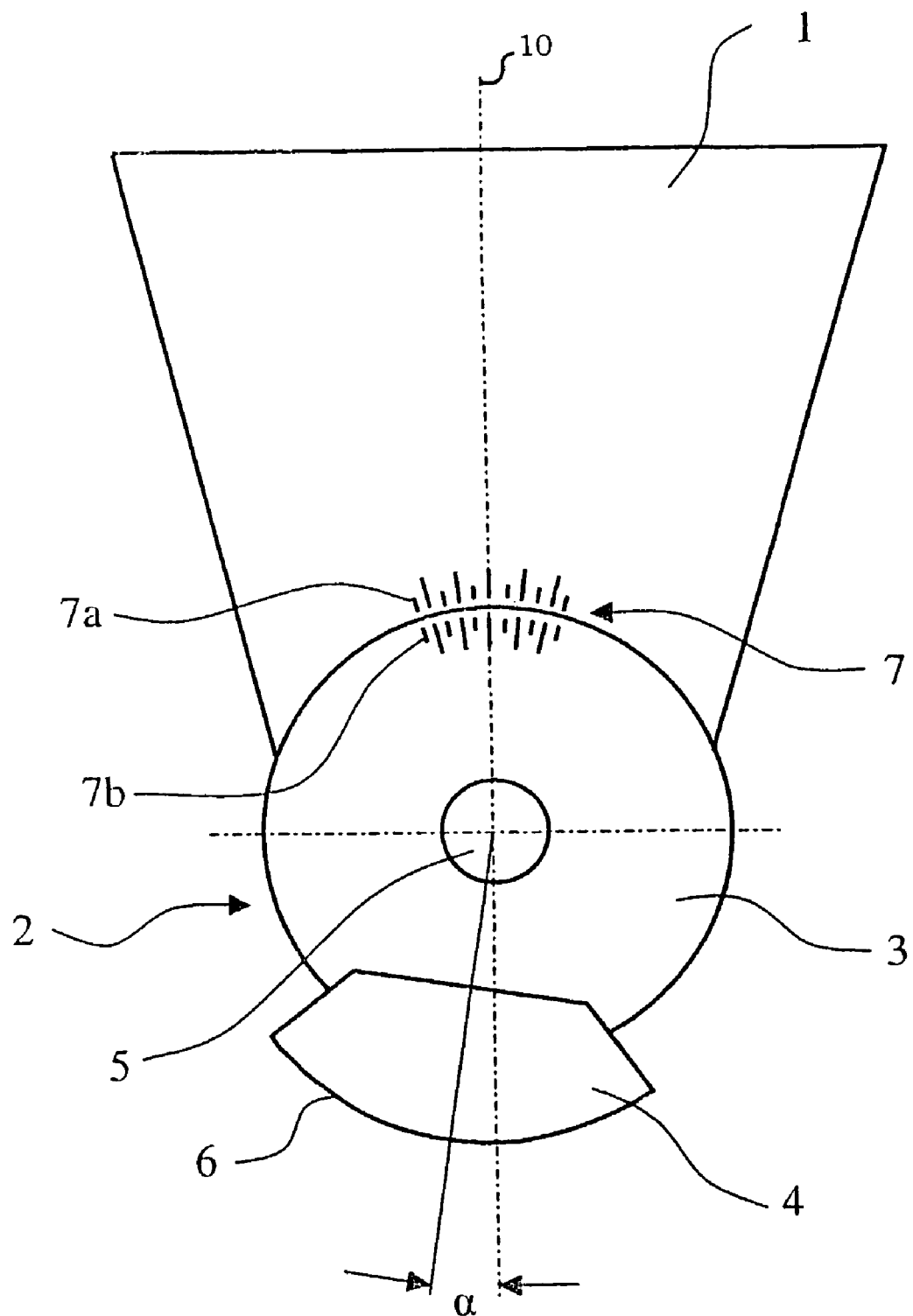
FIG. 1 is a side elevation view of a cutting tool and a work tool holder having a Vernier scale.

FIG. 1 shows an apparatus having a tool holder 1 on which a cutting tool 2 is attached. The cutting tool comprises a hard metal plate 3 and cutting element 4. A natural diamond is provided as the cutting element 4. The attachment of the cutting tool 2 to the tool holder 1 can, for example, be provided by a device such as a screw 5. A perpendicular dash-dot line defines the longitudinal axis 10 through the tool holder 1. The angle a indicates the desired position of the cutting element 4, which is to be adjusted, from this longitudinal axis 10. In the present example, the rotation amounts to 10°. The rotation can take place in the clockwise or counterclockwise direction depending upon the surface to be treated. The rotation usually lies in a range of 5° to 20° but can, however, deviate from these values. Such a deviation from the longitudinal axis 10 of the tool holder 1 is undertaken in order to prevent damage of the glass surface because of a contact with the left or right edge of the cutting element.

Figure 2:
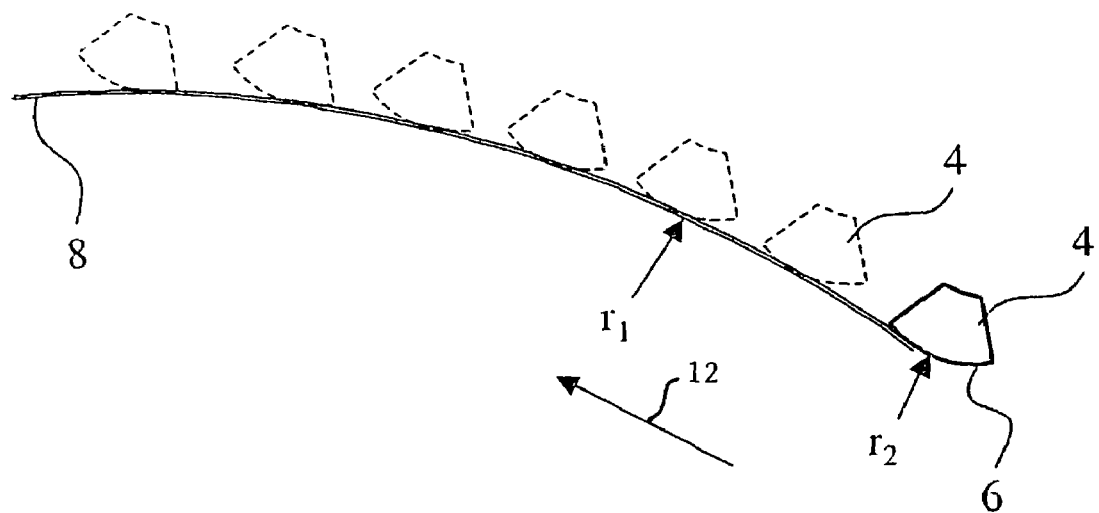
FIG. 2 is a stepwise displacement of a diamond on the glass surface when cutting; and, FIG. 3 is a detail view of the diamond.

As a rule, a two-stage method is used in the machining of the surfaces of progressive lenses or individual spectacle lenses. For the coarse cut, a so-called PKD-plate is first used, that is, a metal cutter filled with diamond dust and having a radius of, for example, 8 mm. For the subsequent fine cut, the natural diamond 4 is used which is soldered to the hard metal plate 3. This plate 3 has, for example, a radius of 4 mm. The intended thrust of the diamond cutter 6 on a glass surface 8 shown in FIG. 2 is, for example, 20 to 80 mm/min. The adjustment of the hard metal plate 3 including diamond 4 on the tool holder 1 takes place via the Vernier scale 7 applied to the cutting tool 2 and tool holder 1 coacting with each other. The Vernier scale 7 is made up of first markings 7a on the tool holder 1 and additional markings 7b on the tool 2. The Vernier scale 7 permits a precise adjustment of the plate 3 on the tool holder in fractions of degrees.

The thrust of the diamond 4 on a glass surface 8, which is to be cut, can be seen in FIG. 2. The thrust direction is indicated by arrow 12. The positions of the diamond 4, which are to be obtained by the thrust, are shown in phantom outline. The glass surface 8 to be cut has a radius $r_1$ of 60 mm. The diameter of the glass surface is, for example, 70 mm. The diamond 4 preferably has an opening angle $\beta=60°$. For this reason, the diamond 4 must be very precisely positioned in order to be able to properly machine (cut) convex and concave surfaces. During cutting, a short contact of respective small regions of the diamond cutter 6 occur with the glass surface 8 to be machined. The apparatus with the diamond 4 is continuously moved, for example, from the outside inwardly so that, in each case, another region of the cutter 6 is subjected to load.

Figure 3:
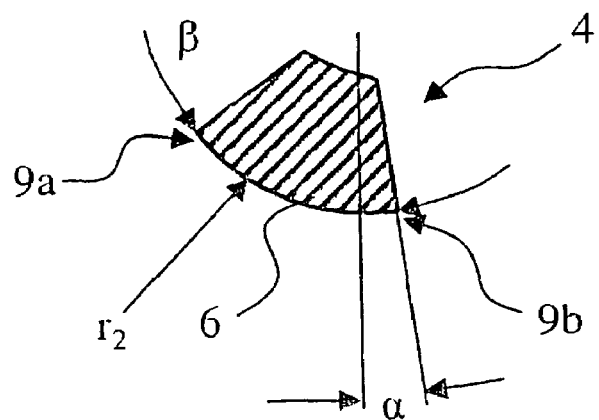

FIG. 3 shows the diamond 4 in detail. The diamond 4 has a cutting edge 6 having a radius $r_2=5$ mm and the opening angle $\beta$ of the diamond is 60°. The rotation a is undertaken during attachment to the tool holder 1. The rotation $\alpha$ of 10° in the counterclockwise direction is indicated. A rotation in the counterclockwise direction is preferred in the machining of concave glass surfaces. With the rotation, damage of the glass surface 8 because of contact with the edges 9a or 9b of the diamond 4 is prevented.

It is understood that the foregoing description is that of the preferred embodiments of the invention and that various changes and modifications may be made thereto without departing from the spirit and scope of the invention as defined in the appended claims.

What is claimed is:

1. An apparatus for machining a workpiece, the apparatus comprising:
   a tool holder having at least a first marking arranged thereon;
   a cutting tool having at least a second marking arranged thereon;
   a device for detachably connecting said tool holder and said cutting tool with each other;
   said markings being arranged so as to permit said tool holder and said cutting tool to be alignable with respect to each other when said tool holder and said cutting tool are connected to each other;
   said cutting tool including a plate and a cutting element attached to said plate;
   said cutting element having lateral edges conjointly enclosing an opening angle in a range of 40° to 80°; and,
   said cutting element defining a cutting edge having a radius.

2. The apparatus of claim 1, wherein said first and second markings are configured so as to define a Vernier.

3. The apparatus of claim 2, wherein said first and second markings are configured as marking points and/or marking crosses.

4. The apparatus of claim 1, wherein said cutting element is soldered to said plate.

5. The apparatus of claim 1, wherein said plate is at least partially configured as a circularly-shaped plate.

6. The apparatus of claim 1, wherein said plate is a metal plate.

7. The apparatus of claim 6, wherein said metal plate is a hard metal plate.

8. The apparatus of claim 1, wherein said cutting element is a diamond.

9. The apparatus of claim 8, wherein said diamond is a natural diamond.

10. The apparatus of claim 1, wherein said opening angle is 60°.

11. The apparatus of claim 1, wherein said radius of said cutting element has a radius in a range of 3 to 10 mm.

12. The apparatus of claim 11, wherein said cutting element has a radius of 5 mm.

13. The apparatus of claim 1, wherein said workpiece is a spectacle lens.

14. The apparatus of claim 13, wherein said spectacle lens is a progressive lens.

15. The apparatus of claim 1, wherein said cutting element has an arcuate cutting edge within said opening angle.

16. The apparatus of claim 15, wherein said arcuate cutting edge is a continuous cutting edge within said opening angle.

17. The apparatus of claim 1, wherein said lateral edges are only two in number and said cutting edge is a continuous arecuate cutting edge delimited by said lateral edges.

18. An apparatus for machining a glass workpiece, the apparatus comprising:
   a tool holder having at least a first marking arranged thereon;
   a cutting tool having at least a second marking arranged thereon;
   a device for detachably connecting said tool holder and said cutting tool with each other;
   said markings being arranged so as to permit said tool holder and said cutting tool to be alignable with respect to each other when said tool holder and said cutting tool are connected to each other;
   said cutting tool including a plate and a cutting element attached to said plate;
   said cutting element having only two lateral edges conjointly enclosing an opening angle in a range of 40° to 80°; and,
   said cutting element defining a continuous curved cutting edge between said two lateral edges to facilitate rotation of said cutting element to prevent damage to the surface of said glass workpiece because of a content therewith by one of said lateral edges.

* * * * *

UNITED STATES PATENT AND TRADEMARK OFFICE
CERTIFICATE OF CORRECTION

PATENT NO. : 7,645,099 B2  Page 1 of 1
APPLICATION NO. : 11/410204
DATED : January 12, 2010
INVENTOR(S) : Norbert Blum It is certified that error appears in the above-identified patent and that said Letters Patent is hereby corrected as shown below:

Column 2:
Line 58: delete "a" and substitute -- $\alpha$ -- therefor.

Column 3:
Line 33: delete "a" and substitute -- $\alpha$ -- therefor.

Column 4:
Line 23: delete "has a radius" and substitute -- lies -- therefor.
Line 37: delete "arecuate" and substitute -- arcuate -- therefor.
Line 58: delete "content" and substitute -- contact -- therefor.

Signed and Sealed this

Thirteenth Day of April, 2010

David J. Kappos
*Director of the United States Patent and Trademark Office*